Aug. 31, 1926.
H. N. WILHELM
1,597,943
WINDSHIELD BRACKET
Filed April 16, 1924
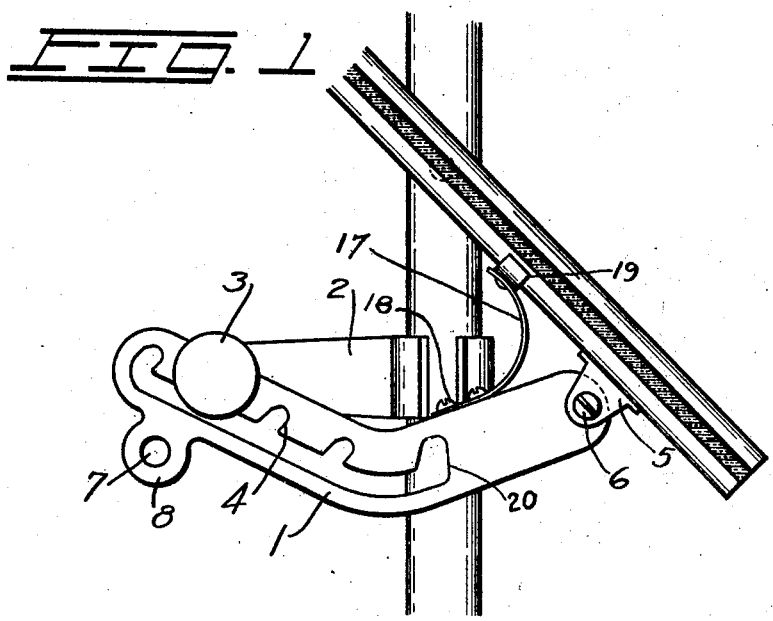
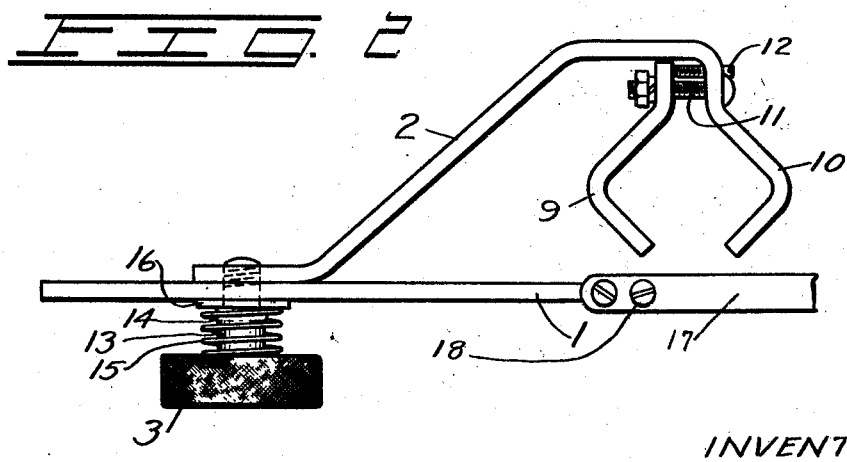
INVENTOR
Harold N. Wilhelm
Harry Bowen
ATTORNEY Patented Aug. 31, 1926.

1,597,943

UNITED STATES PATENT OFFICE.

HAROLD N. WILHELM, OF NEWCASTLE, WASHINGTON.

WINDSHIELD BRACKET.

Application filed April 16, 1924. Serial No. 706,833.

The invention is a bracket for holding windshields or the like by which the windshield may be positively held in different open positions or closed.

The object of the invention is to provide a simple and efficient bracket for windshields or the like which will hold the windshield in different positions.

Another object of the invention is to provide a bracket for holding windshields or the like that may readily be installed.

And a further object of the invention is to provide a bracket for windshields or the like that will positively lock the windshield in different positions.

With these ends in view the invention embodies a bracket having an angular shaped member with notches in it which will engage a spring pin in a positive bracket that may be attached to the windshield frame, a clip for holding the opposite end of the angular shaped member to the windshield and a spring that may be attached to the upper edge of the angular shaped member and arranged so that its outer end will bear against the inner surface of the windshield.

Other features and advantages of the invention will be seen from the following description taken in connection with the drawing, wherein:—

Figure 1 is a view showing the bracket in place.

Figure 2 is a plan view showing the stationary clamp and spring pin.

In the drawings I have shown my device as it would be constructed wherein numeral 1 indicates the angular shaped member, numeral 2 the stationary bracket and numeral 3 the spring pin.

The member 1 may be made as shown in Figure 1 with an opening having notches 4 in its upper side in it, and having one end pivotally attached to a windshield frame by a clip 5 through a pin 6. An opening 7 may be placed in a boss 8 adjacent the opposite end so that the bracket may be gripped and moved to different positions.

The stationary bracket 2 in which the pin 3 is screwed is provided with a removable jaw 9 and a similar rigid jaw 10 with bolts 11 for holding the two jaws together and a screw 12 for causing a positive grip between the jaws. It will be seen that as the screw 12 is placed beyond the two bolts 11 it will increase the gripping power of the jaws as it is screwed inward.

The screw 3 is provided with a shank 13 having a shoulder 14 at one end, and a spring 15 that bears against a washer 16 is mounted around this shank. It will be seen that as the screw 3 is screwed into the end of the bracket 2 the shoulder 14 will force the washer 16 against the member 1 and positively grip it and also that if the screw 3 is left partly loose the spring will take up any play and prevent the device from rattling.

Another spring 17, as shown in Figure 1, is attached to the upper side of the member 1 by bolts 18 and the outer end of the spring is provided with a clip 19 which will engage the side of the windshield and hold the spring in place.

It wil be observed that the slots 4 in the member 1 slope outward and taper slightly at their upper edges so that the weight of the windshield will force the pin up into the slot and the force of the spring 17 will tend to hold the outer end of the member 1 downward upon the pin. The upper edges of the slots are slightly beveled so that as wear develops the pin will move further up into the slots so that it will be positively gripped at all times. The slot 20 at the rear end of the opening will be used to lock the windshield closed, and it will be seen that the forward side of this slot is beveled so that as it is forced over the pin it will wedge the windshield and thereby hold it with a firm grip. It will also be seen that as it is desired to move the windshield from one position to another the screw 3 will be loosened so that the member 1 may be moved until another notch engages the screw and then the screw may be tightened to hold the windshield rigidly.

Having thus fully described the invention, what I claim as new and desire to secure by Letters Patent, is:—

In a windshield bracket, an angular shaped bar pivotally attached to the windshield, a resilient member between the upper edge of the bar and the windshield, a spring pin, a bracket for supporting the spring pin, said bracket being attached to the frame of the windshield, said bar having a slot therein with notches to engage the spring pin in its upper edge, and said spring pin being adaptable to fit into the said notches and frictionally grip the bar.

HAROLD N. WILHELM.